US 12,487,657 B1

(12) United States Patent
Gruber

(10) Patent No.: US 12,487,657 B1
(45) Date of Patent: Dec. 2, 2025

(54) POWER-SAVING HARDWARE POLLING PERIPHERAL

(71) Applicant: Trident IoT, LLC, San Diego, CA (US)

(72) Inventor: Brandon Gruber, San Marcos, CA (US)

(73) Assignee: Trident IoT, LLC, Carlsbad, CA (US)

( * ) Notice: Subject to any disclaimer, the term of this patent is extended or adjusted under 35 U.S.C. 154(b) by 0 days.

(21) Appl. No.: 18/887,675

(22) Filed: Sep. 17, 2024

(51) Int. Cl.
*G06F 1/26* (2006.01)
*G06F 1/3234* (2019.01)
*G06F 1/3203* (2019.01)

(52) U.S. Cl.
CPC .......... *G06F 1/325* (2013.01); *G06F 1/3203* (2013.01)

(58) Field of Classification Search
CPC ...................................... G06F 1/325
USPC ...................................... 713/320
See application file for complete search history.

(56) References Cited

U.S. PATENT DOCUMENTS

| | | | | |
|---|---|---|---|---|
| 5,892,956 | A * | 4/1999 | Qureshi | G06F 13/26 710/48 |
| 8,892,918 | B2 * | 11/2014 | Dohm | G06F 1/3287 713/320 |
| 11,630,790 | B1 * | 4/2023 | Zhang | G06F 13/28 710/260 |
| 2007/0124566 | A1 * | 5/2007 | Cohen | G06F 15/7814 712/208 |
| 2012/0300505 | A1 * | 11/2012 | Chueh | H02M 3/33507 363/21.09 |
| 2016/0371099 | A1 * | 12/2016 | Woog | H04L 69/28 |
| 2017/0046301 | A1 * | 2/2017 | Walker | H04L 43/0823 |
| 2017/0295545 | A1 * | 10/2017 | Zacchio | H04W 52/0229 |
| 2018/0088961 | A1 * | 3/2018 | Doshi | G06F 1/3287 |
| 2018/0188768 | A1 * | 7/2018 | Skjoldborg | H04R 3/00 |
| 2018/0335830 | A1 * | 11/2018 | Srivastava | G06F 1/325 |
| 2019/0204900 | A1 * | 7/2019 | Nair | G06F 1/3287 |
| 2022/0001550 | A1 * | 1/2022 | Son | B25J 13/08 |
| 2023/0072000 | A1 * | 3/2023 | Fox | G06F 11/3476 |

* cited by examiner

*Primary Examiner* — Volvick Derose
(74) *Attorney, Agent, or Firm* — Thibault Patent Group

(57) ABSTRACT

Embodiments of a system, method and apparatus are described for reducing power consumption of a battery-powered electronic device. A hardware polling peripheral operates in conjunction with a CPU within the battery-powered electronic device. When the CPU enters a quiescent state in order to save power, the hardware polling peripheral begins the polling cycle that polls one or more I/O pins of the hardware polling peripheral to detect a change in state. Polling is controlled by hardware registers and digital logic circuits without the use of firmware. When the hardware polling peripheral determines that an I/O pin has changed state, it wakes the CPU from the quiescent state via an interrupt.

20 Claims, 8 Drawing Sheets

POWER-SAVING HARDWARE POLLING PERIPHERAL

BACKGROUND

I. Field of Use

The present application relates generally to electronic circuit design and more specifically to various embodiments of a system, apparatus and method for reducing power consumption of battery-powered electronic devices.

II. Description of the Related Art

Battery-powered devices are typically designed to minimize power consumption. In devices that utilize a microprocessor, microcontroller or the like, a number of I/O pins are usually present, each I/O pin for sending or receiving digital information. Oftentimes, an I/O pin is dedicated for interrupting the microprocessor in order to perform a certain function when a change occurs in the state of the particular I/O pin.

Interrupting the microprocessor may be accomplished using either interrupts or polling, and each have their advantages and disadvantages. Polling is usually considered to be less energy-efficient than using interrupts, because of the need to continuously check an I/O port to see if its state has changed. In addition, additional current may be drawn by the common practice of using internal or external pull-up (or down) resistors on I/O inputs, which draws current when an I/O pin is pulled to the low (or high) state. Such current draw may be minimized by energizing the pull-up or pull-down resistors only when polling an input. However, polling may be difficult or even impossible to perform by complex processors with complex communication stacks that take control of a processor's clock and adds too much overhead to be able to efficiently duty cycle the processor.

Interrupts may alternatively be used; however, they may cause irregular wake-up behavior, and they also require that an I/O pin be dedicated for such purposes.

SUMMARY

Embodiments of the present invention are directed towards systems, methods and apparatus for reducing power consumption of a battery-powered electronic device. In one embodiment, a battery-powered electronic device is described, comprising a processor, and a hardware polling peripheral, configured to periodically poll one or more configurable I/O pins of the hardware polling peripheral for a change in state while the processor is in a low-power state, comprising an I/O configuration register configured to store I/O configuration information associated with the one or more configurable I/O pins, polling logic for configuring a first I/O pin of the hardware polling peripheral as an input and a second I/O pin of the hardware polling peripheral as an output in accordance with the I/O configuration register, for periodically polling the first I/O pin while the processor is in the low-power state and sending an interrupt signal to the processor via the second I/O pin when a change of state of the first I/O pin is detected.

In another embodiment, a method is described for reducing a power consumption of a battery-powered electronic device, comprising configuring a hardware state machine of a hardware polling peripheral to provide state signals to polling logic of the hardware polling peripheral, configuring a hardware I/O configuration register of the hardware polling peripheral with I/O pin configuration information associated with one or more I/O pins of the hardware polling peripheral, respectively, the I/O pin configuration information indicating that a first I/O pin of the hardware polling peripheral is an input and a second I/O pin is an output of the hardware polling peripheral, sending a signal to the hardware polling peripheral indicating that a processor coupled to the hardware polling peripheral is or will be in a low-power mode of operation, entering, by the processor, the low-power state of operation, in response to receiving the signal, periodically polling the first I/O pin of the hardware polling peripheral by the polling logic in accordance with the hardware state machine for a change in state of the first I/O pin while the processor is in the low-power state of operation, an sending an interrupt signal to the processor via the second I/O pin when a change in state of the first I/O pin is detected.

BRIEF DESCRIPTION OF THE DRA WINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of a system, method and apparatus are described for reducing the power consumption of battery-powered electronic devices using a polling peripheral that relies on hardware alone to perform polling of one or more I/O pins. The hardware polling peripheral generally operates independently of a processing unit, such as a core processor of a microprocessor, microcontroller, or custom ASIC, such that when the core processor enters a low-power, or quiescent, mode of operation to save power, the hardware polling peripheral is operational to poll its I/O pins. The hardware polling peripheral may comprise programmable registers, polling logic, logic gates, transistors, and other discrete components to configure itself, in one embodiment, for operation during an idle state, a warm-up state and an active state of a polling cycle. The embodiments described are improvements to computer technology as it allows complex processing units to remain in a low-power state while polling for input changes using a minimum amount of power. In one embodiment, the hardware polling peripheral described herein uses no firmware or computer-executable instructions to periodically poll for input changes.

Figure 1:
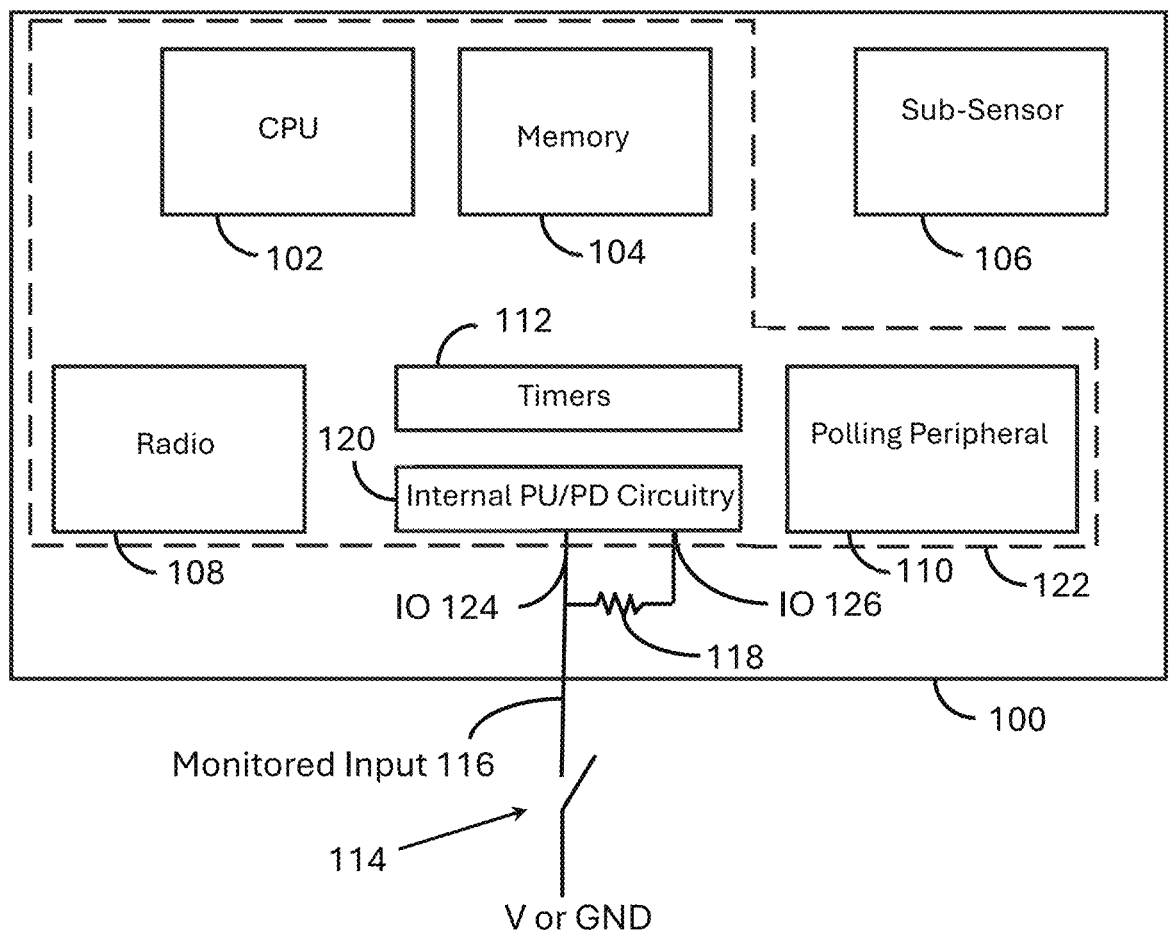
FIG. 1 is a functional block diagram of one embodiment of a battery-powered electronic device in accordance with the inventive principles discussed herein.

FIG. 1. is a functional block diagram of one embodiment of a battery-powered electronic device 100 in accordance with the inventive principles discussed herein. Examples of battery-powered device 100 may include a wide variety of electronic sensors, such as security sensors, environmental sensors, shock/vibration sensors or any other battery-powered electronic sensor used in residential and commercial environments. More broadly, battery-powered electronic device 100 may comprise any battery-powered electronic device.

Shown in FIG. 1 is CPU 102, memory 104, sub-sensor 106, radio 108, hardware polling peripheral 110, timer(s) 112 and internal pullup/pulldown circuitry 120. It should be understood that the functional blocks shown in FIG. 1 are merely exemplary, and that in other embodiments, battery-powered device 100 may comprise fewer, or additional, functional blocks, that the functional blocks may be coupled to one another in a variety of ways, and that some functional blocks are not shown, such as a battery, for clarity purposes. In one embodiment, some or all of the functional blocks shown in FIG. 1 may be integrated into a single die, custom ASIC, System-on-Chip (SoC), System-in-Packaging (SiP) modules, or similar. Examples of integration of the various functional blocks of FIG. 1 may include a Zwave® EFR32ZG23 system-on-chip, a Zwave ZGM230S module, a Zigbee® EFR32MG1, etc. In the example shown in FIG. 1, CPU 102, memory 104, radio 108, hardware polling peripheral 110, timer(s) 112 and internal pullup/pulldown circuitry 120 are all part of a custom SoC, SiP or ASIC 122.

Battery-powered device 100 may monitor one or more inputs for changes in state, i.e., a change in voltage in accordance with common digital principles. As used herein, the term "voltage" may mean any DC voltage, typically between -5 volts and +5 volts, including zero volts, sometimes referred to herein as "ground". While only a single input 116 to battery-powered device 100 is shown, in other embodiments, two or more inputs may be present, each coupled independently to hardware polling peripheral 110, in some embodiments, via internal pullup/pulldown circuitry 120 via I/O pin 124 of custom SoC, SiP or ASIC 122. Throughout this disclosure, reference to input 116 and I/O pin 124 may additionally include reference to one or more other inputs, each coupled either directly or indirectly (i.e., via internal pullup/pulldown circuitry 120) to hardware polling peripheral 110 via respective I/O pins.

As shown in FIG. 1, input 116 is electrically coupled to an I/O pin 124 of custom SoC, SiP or ASIC 122, configured in this example as a digital input. In some embodiments, I/O pin 124 is coupled to internal pullup/pulldown circuitry 120 which, in turn, is coupled to polling peripheral 110 while in other embodiments, I/O pin 124 is coupled directly to polling peripheral 110. Each I/O pin may be bidirectional, configurable via, in some embodiments, a general purpose I/O pin logic controller (shown in FIG. 2) and one or more digital hardware registers of hardware polling peripheral 110. The term "pin", as used herein, may refer to a physical pin of an integrated circuit or, more broadly, to a physical conductor or connector for sending and receiving information to/from a component, circuitry or device external to hardware polling peripheral 110.

In the example shown in FIG. 1, battery-powered device 100 monitors one or more external electronic elements, such as switch 114, for changes in state. External switch 114 may comprise a simple manual switch or a complex, digitally controlled electronic switch, such as a transistor of an external digital thermometer that, for example, provides a warning when a monitor temperature exceeds a predetermined threshold. Hardware polling peripheral 110 may monitor for internal inputs as well, such as signals from radio 108 when a wireless message is received, a signal from sub-sensor 106, such as a signal that a door or a window has been opened, etc.

Figure 2:
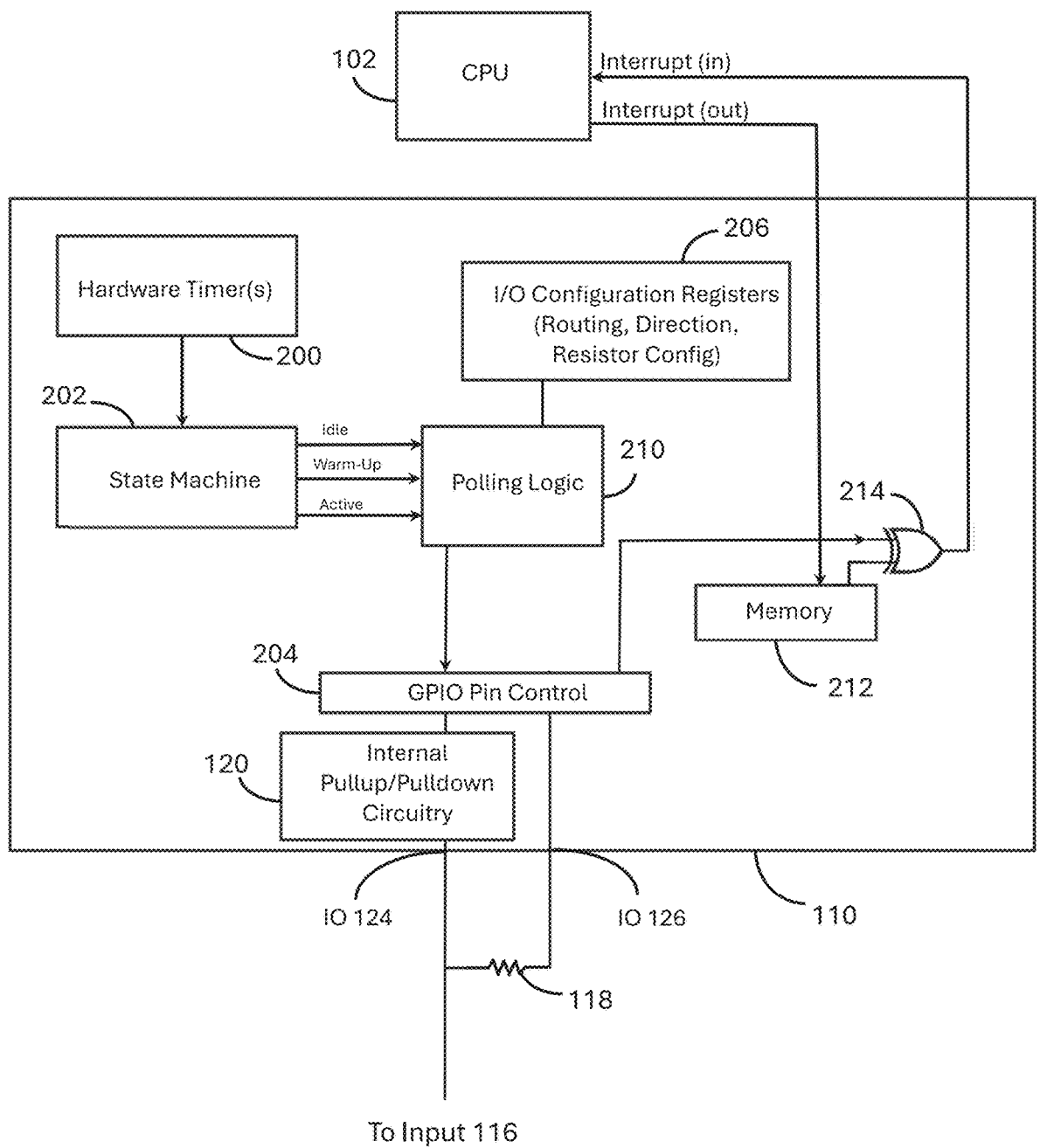
FIG. 2 is a functional block diagram of a hardware polling peripheral as shown in FIG. 1, in this embodiment comprising one or more registers, polling logic, internal resistors, transistors, timers and one or more state machines for monitoring an I/O pin of the hardware polling peripheral for changes in state.

In many cases, a pull-up, or pull-down, resistor may be used to definitively determine a digital state of input 116. FIG. 1 shows external resistor 118 (i.e., external to hardware polling peripheral 110) coupled to I/O pin 124 and internal pullup/pulldown circuitry 120 (herein "internal PU/PD circuitry 120) also coupled to I/O pin 124. Internal PU/PD circuitry 120 comprises one or more resistors configurable as pullup resistors (i.e., with a voltage, commonly Vcc, dynamically applied to one end of each resistor or pulldown resistors (i.e., a different voltage, such as -Vcc, or ground, applied to one end of one or more internal resistors). Typically, each I/O pin may be configured independently from other I/O pins. In some embodiments, configuration as a pullup or pulldown is performed dynamically to minimize power consumption caused by current flowing through the resistors, i.e., a voltage or ground is applied only during a warm-up state and/or an active state of a polling cycle. In the case of external resistor 118, an I/O pin 126 may be configured dynamically as an output, providing either a voltage or a different voltage, or ground, to I/O pin 126 (depending on whether external resistor 118 is configured as a pull-up or pull-down resistor) during a short time period, i.e., typically in µs, during the warm-up state and/or the active state of a polling cycle. In the case of internal PU/PD circuitry 120, a general-purpose input/output (GPIO) pin control polling logic 204 of hardware polling peripheral (as shown in FIG. 2) may dynamically configure internal and external resistors for use as pullup or pulldown resistors, by applying a voltage, or ground, to one end of a resistor and coupling the other end to the resistor to a particular I/O pin 124.

The various functional blocks shown in FIG. 1 are coupled to each other via one or more data, control and address buses, as is well-known in the art and, hence, not shown.

CPU 102 comprises a digital processor for executing processor-executable computer instructions stored in memory 104 for providing operational functionality of battery-powered device 100. CPU 102 may comprise one or more processing cores, microprocessors, microcomputers, microcontrollers, custom ASICs, or the like, and where two or more processors are used, each of the processors, either alone or in combination, may execute one or more of the processor-executable instructions that cause CPU 102 to perform various functions. CPU 102 may be selected based on a variety of factors, including power-consumption, size, and cost. In one embodiment, CPU 102 comprises an ARM Cortex-M33 core processor, however other, similar core processors may be used alternatively.

Memory 104 is coupled to CPU 102, comprising one or more information storage devices, such as RAM, ROM, flash memory, or some other type of electronic, optical, or mechanical memory device(s). Memory 104 is used to store processor-executable instructions for functional operation of battery-powered device 100, as well as any information used by CPU 102, such as register values, counter values, addressing information, status information, etc. The processor-executable instructions may comprise instructions in accordance with well-known IoT protocols, such as Zwave or Zigbee. It should be understood that memory 104 is non-transitory, i.e., it excludes propagating signals.

Timer(s) 112 provide one or more timing signals to one or more other functional elements of battery-powered device 100. Timer(s) 112 are typically programmable to provide a variety of timing signals to battery-powered device 100. In one embodiment, timer(s) 112 may provide hardware polling peripheral 110 with timing signals to monitor I/O pin 124 during several states, such as an active state, a warm-up state, and an idle state, which will be described in greater detail later herein. It should be understood that throughout this specification, although three polling states are described, in other embodiment, a greater, or fewer, polling states may be used. For example, in another embodiment, only two polling states may be defined, an idle state and an active state. Such timer(s) 112 are well-known in the art.

Radio 108 is used in applications where wireless communications are desired with battery-powered device 100. In these embodiments, radio 108 comprises an RF transceiver for sending and receiving wireless communication signals with other devices, typically within a local-area network. Radio 108 typically comprises a low-power transceiver suitable for battery-powered electronic devices. Radio 108 sends and receives wireless communication signals typically in accordance with one or more well-known local, wireless, communication protocols, such as the well-known Zwave and Zigbee protocols.

Sub-sensor 106 is used in applications where battery-powered device 100 comprises a sensor. In these embodiments, sub-sensor 106 comprises one or more electronic sensors for determining a condition, status, and/or characteristic of battery-powered device 100 or its surrounding environment. Typical sub-sensors may comprise a reed switch, a PIR, a thermal sensor, a pressure sensor, or virtually any sensor that detects a physical property and converts it into electronic signals. Such sub-sensors are well-known in the art.

Hardware polling peripheral 110 may comprise memory registers, polling logic, logic gates, internal resistors, transistors or other discreet components, one or more timers and one or more state machines for monitoring I/O pin 124 for changes in state, i.e., changes in voltage, typically voltages representing digital logic states. Upon detecting a change in state, hardware polling peripheral 110 may wake CPU 102 from a low-power operating state for CPU 102 to perform one or more actions. As explained above, hardware polling peripheral 110 may utilize pull-up or pull-down resistors for ensuring a particular digital state of any monitored inputs, such as input 116. In the case of pull-up resistors, a voltage may be applied to one end of such resistors continuously or only when input 116 is polled. Similarly, in the case of pull-down resistors, one end of each resistor may be continuously coupled to ground or only when input 116 is polled. In one embodiment, a pull-up voltage or pull-down ground is applied to an external resistor 118 via an I/O port of hardware polling peripheral 110, such as I/O pin 126, either continuously or only when I/O pin 124 is polled.

Hardware polling peripheral 110 is used to monitor one or more I/O pins of battery-powered device 100, hardware polling peripheral 110 and/or custom SoC, SiP or ASIC 122 while CPU 102, and potentially other functional blocks of battery-powered device 100, is/are in a low-power state of operation. Hardware polling peripheral 110 is designed so that battery-powered electronic device 100 draws less power than otherwise using conventional interrupt or polling techniques. In some embodiments, hardware polling peripheral 110, or portions thereof, may operate continuously and in a normal state of operation, continuously polling I/O pin 124 at least while CPU 102 is in a low-power state of operation and, in other embodiments, while CPU 102 is in an active state. In one embodiment, hardware polling peripheral 110 may provide an output signal on I/O pin 126, providing a temporary voltage or ground to I/O pin 126 in embodiments that utilize one or more external resistors 118.

Once a change in state occurs on I/O pin 124 as a result of input 116 changing state, hardware polling peripheral 110 may cause CPU 102 to wake from the low-power state, typically by sending an interrupt to CPU 102 on one of CPU 102's I/O lines. CPU 102 may then perform one or more operations in accordance with the processor-executable instructions stored in memory 104.

FIG. 2 is a functional block diagram of one embodiment of hardware polling peripheral 110, configured to monitor I/O pin 124 for changes in state while at least CPU 102 is in a low-power, or quiescent, state, and for waking CPU 102 upon such a change in state. FIG. 2 shows CPU 102, internal pullup/pulldown circuitry 120, external resistor 118, input 116, a low-power hardware timer 200, a state machine 202, GPIO 204, one or more I/O configuration registers 206, polling logic 210, memory 212 and circuitry 214.

Low-power hardware timer 200 may be used to provide digital timing signals to state machine 202, typically comprising a crystal oscillator, hardware registers, one or more digital counters, etc., all well-known in the art. In some embodiments, hardware timer 200 may be located externally to hardware polling peripheral 110, for example, timer(s) 112.

State machine 202 receives the timing signals from low-power hardware timer 200 and generates one or more digital signals for causing polling logic 210 to enter into one or more operating states for polling I/O pin 124. In this example, three operating states are defined: an idle state, a warm-up state and an active state. In other embodiments, state machine is not used. In these embodiments, polling logic 210 may be configured by CPU 102 to periodically poll I/O pin 124, including an allowance for a warm-up period.

In the current embodiment, state machine 202 comprises three outputs, each output associated with a respective one of the three operating states of the polling cycle. Polling logic 210 performs certain, predetermined actions in accordance with each state. State machine 202 may be configured by CPU 102 to provide the state signals cyclically at particular times. For example, it may be desirable to configure state machine 202 to provide for an idle state of 200 ms, a warm-up state for 10 us after the idle state has expired (4 us to configure I/O pin 124, for example, as an input and 6 us to wait for internal/external circuitry to "warm up") and an active state for 10 us for polling logic 210 to poll I/O pin 124. Thus, in this example, when the idle state begins, polling logic 210, via GPIO 204, may reconfigure any I/O pins that had previously been configured as inputs or outputs to a "null" state and remove any pullup or pulldown voltages or grounds previously applied to particular I/O pins during the warm-up and active states.

Figure 4:
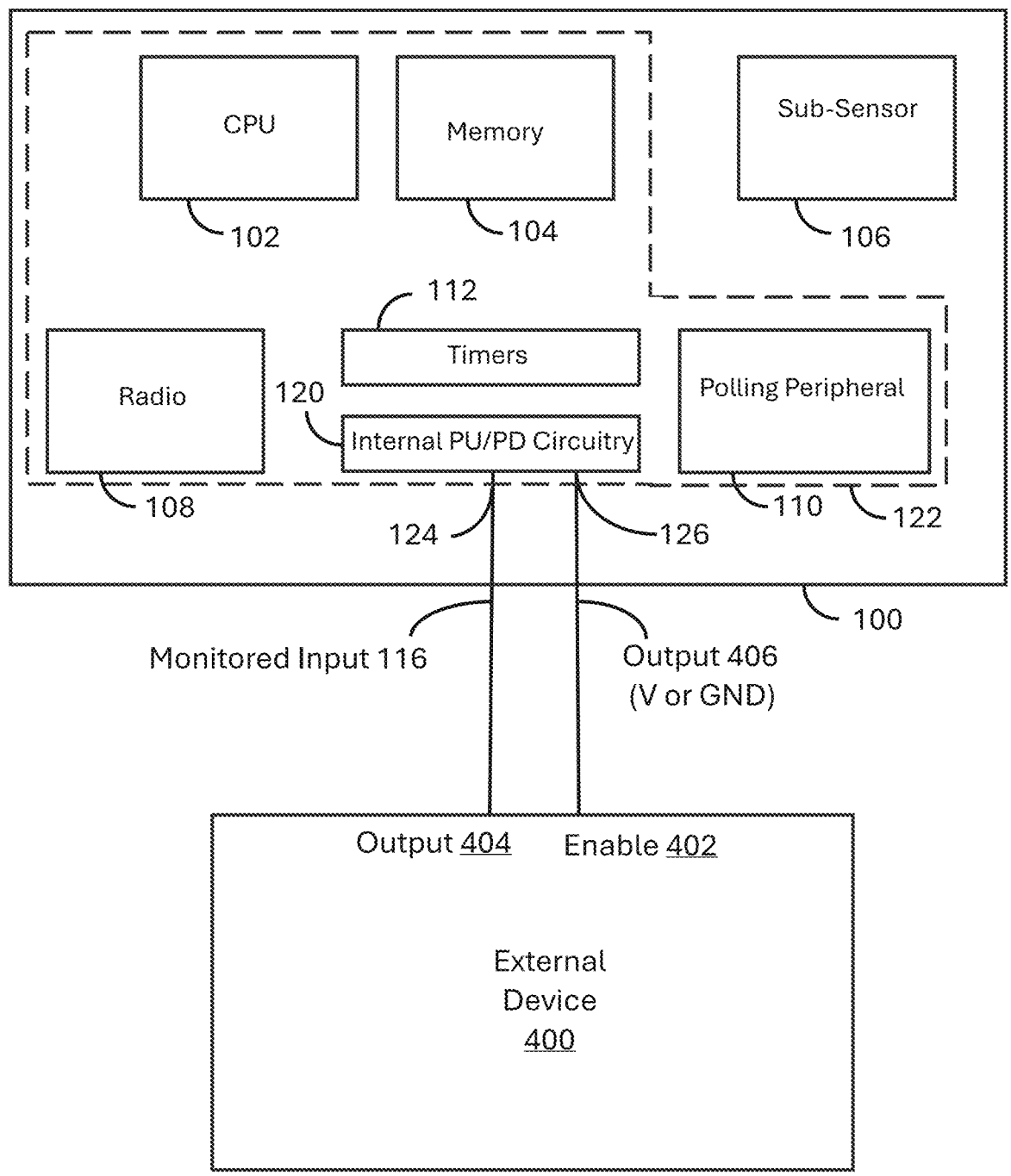
FIG. 4 is a functional block diagram of the battery-powered electronic device as shown in FIG. 1 used with circuitry external to the hardware polling peripheral.

When the idle state expires, in this embodiment, the warm-up state begins. At this time, polling logic 210, in some embodiments, via GPIO 204, configures one or more I/O pins in accordance with I/O configuration register 206. This may involve configuring I/O pin 124 as an input, I/O pin 126 as an output (for sending an interrupt to CPU 102), applying a pull-up or pull-down voltage to I/O pin 124 via internal PU/PD circuitry 120 or to external resistor 118 via I/O pin 126, and/or applying a voltage or ground to I/O pin 126 for use as an input to external circuit/device, as shown in FIG. 4. After the warm-up state has concluded, the active state begins, and polling logic 210 reads the voltage on I/O pin 124. After this, the polling cycle typically reverts back to the idle state, unless a change in state of I/O pin 124 is detected (from the last time I/O pin 124 was polled) or CPU 102 interrupts the polling cycle.

In one embodiment, if I/O pin 124 has changed voltage from a previous reading, polling logic 210 may continue reading the voltage on I/O pin 124 or wait a predetermined time and read I/O pin 124 one or more times, to confirm the reading, i.e., to allow debounce of I/O pin 124. After confirming the reading, CPU 102 may be notified of a change of state of I/O pin 124.

Polling peripheral 110 comprises, in this embodiment, one or more I/O configuration registers 206, polling logic 210, memory 212 and logic gate circuitry 214. I/O configuration register 206 comprises one or more hardware memory registers or discrete electronic components used to store information for configuring inputs and outputs of polling logic 210, such as to configure one or more I/O pins as inputs or outputs. I/O configuration registers are programmed by CPU 102 when CPU 102 is in an active state of operation and read by polling logic 210 during at least one polling cycle. Such hardware memory registers are well-known in the art.

Configuration register 206 may additionally store information for configuring internal PU/PD circuitry 120 and/or one or more I/O pins as external pullup/pulldown resistors. For example, configuration register 206 may store information used to apply Vcc to a particular internal resistor of internal PU/PD circuitry 120 as a pull-up resistor for I/O pin 124, as well as information used to apply ground to a second particular internal resistor of internal PU/PD circuitry 120 for a different I/O pin of hardware polling peripheral 110.

Polling logic 210 comprises digital hardware logic gates, such as AND gates, OR gates, NAND gates, NOR gates, and/or other logic gates, one or more integrated circuits, and/or discreet electronic components, etc. for configuring I/O pins at certain times during the various polling states, and to notify CPU 102 of a change of state of I/O pin 124. In some embodiments, polling logic 210 may comprise discrete groups of polling logic and supporting electronics, one group associated with the idle polling state, another group associated with the warm-up polling state and still another group associated with the active polling state.

Memory 212 is used to store a previous state of input pin 116, i.e., a digital logic level associated with one or more I/O pins (configured as inputs) determined prior to a current reading of each pin. Memory 212 may comprise one or more discrete electronic components, such as one or more transistors, capacitors, resistors, etc., typically capable of storing state information associated with I/O pin 124, i.e., digital 1s and 0s. Memory 212 is typically separate and distinct from memory 104, as memory 104 is typically disabled when CPU 102 is in a low-power state.

Logic gate circuitry 214 comprises one or more digital logic and/or discrete electronic components to compare a present reading of I/O pin 124 to a previous reading of I/O pin 124 as stored by memory 212. If there has been no change in state of I/O pin 124 from one reading to the next, the output of logic gate circuitry 214 will typically remain the same and polling logic 210 will return to the idle state. Otherwise, when a change in state from one reading to another occurs, the output of logic gate circuitry 214 will change, causing polling peripheral 110 to notify CPU 102 in order to wake CPU 102 from a quiescent operating state. In one embodiment, after a state change from one reading to the next, polling logic 210 may continue reading input 116 in order to confirm that the state has actually changed, i.e., an attempt to eliminate a false reading due to, for example, noise or debouncing on I/O pin 124.

Figure 3:
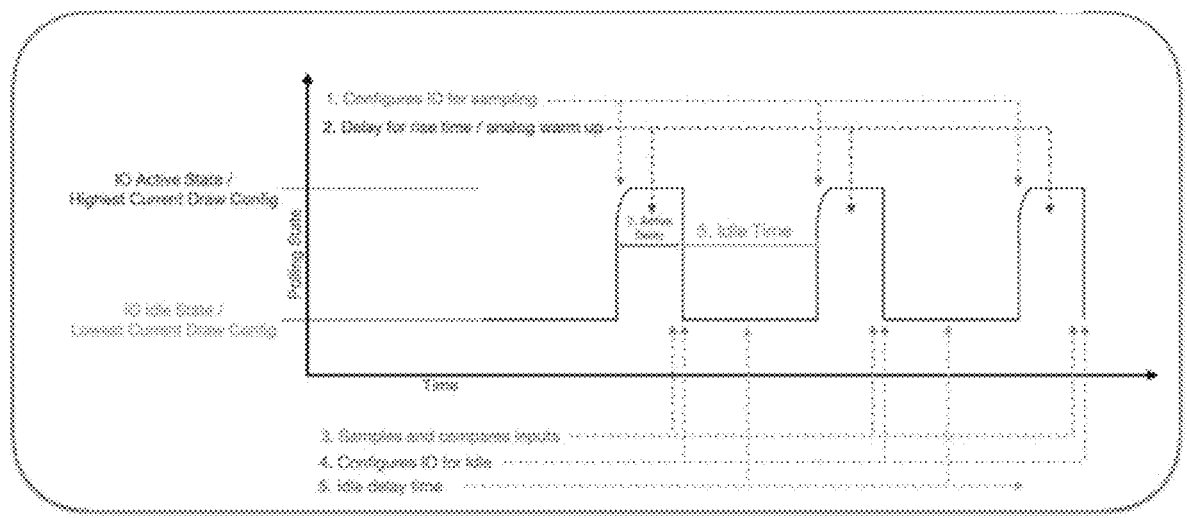
FIG. 3 is a timing diagram illustrating one embodiment of how the hardware polling peripheral as shown in FIG. 2 may poll an I/O pin of the hardware polling peripheral.

FIG. 3 is a timing diagram illustrating one embodiment of how hardware polling peripheral 110 may poll I/O pin 124. It illustrates how hardware polling peripheral 110 polls I/O pin 124 over time, operating in an idle state for much of the time. After a predetermined time, hardware polling peripheral 110 enters the warm-up state, shown in FIG. 3 as step 1. At this point, polling logic 210, via GPIO 204 in some embodiments, may configure one or more I/O pins as input or output, such as to configure I/O pin 124 as an input and I/O pin 126 as an output. In one embodiment, configuration of I/O pins as input or output may be performed once, during a first polling cycle, and retained in further polling cycles. Polling logic 210, again via GPIO 204 in some embodiments, may also configure one or more internal resistors of internal PU/PD circuitry 120 and/or external resistors 118 via I/O pin 126 as pull-up/pull-down resistors. Configuring one or more internal resistors 120 may mean applying a voltage or ground to one end of the one or more of the internal resistors of internal PU/PD circuitry 120, respectively. Configuring one or more external resistors 118 may mean applying a voltage or ground to I/O pin 126 connected to a respective external resistor 118. In one embodiment, the warm-up state may comprise additional time for external circuitry 400 (as shown in FIG. 4) shown in FIG. 3 as step 2, labeled as "active delay," to "warm up" or attain a stable operating state, such as to allow for capacitors to be charged, op-amps to fully activate, pullup or pulldown resistors to attain a pullup or pulldown voltage, or any other circuitry, including circuitry of external circuitry 400, that need some amount of time to achieve a stable operating state.

After a predetermined delay after entering the warm-up state, i.e., after the time period allocated for the warm-up state expires, polling logic 210 reads I/O pin 124 to determine its voltage level and may compare it to a previous voltage reading. The time needed to read I/O pin 124 may be referred to herein as the active state, and is typically very short, on the order of one or just a few clock cycles of timer(s) 202, i.e., between 1 and 20 us typically. During the active state, the I/O configuration and resistor configuration typically remains the same as in the warm-up state. If the voltage on input 116 has not changed from the previous voltage reading, polling logic 210 may be returned to the idle state, as shown in step 4. The next reading of input 116 occurs after a predetermined idle time expires, as shown in step 5.

FIG. 4 is a functional block diagram of battery-powered device 100 used with external circuitry 400, i.e., circuitry external to hardware polling peripheral 110 or external to battery-powered device 100 where hardware polling peripheral 110 is used to duty cycle at least a portion of external circuitry 400, i.e., activate external circuitry 400 for short periods of time and read one or more outputs. While external circuitry 400 is shown as being external to battery-powered device 100, alternatively, it could be part of battery-powered device 100 but external to polling peripheral 110. External circuitry 400 may comprise virtually any type of circuitry and particularly, circuitry where power consumption is a concern. For example, external circuitry 400 may comprise front-end circuitry of a listening device, comprising a microphone, amplification circuitry, a filter and a comparator for determining when an audio signal of interest has been received. Of course, external circuitry 400 could alternatively comprise any other active electronic component, IC, circuit or an electronic device separate from polling peripheral 110 or battery-powered electronic device 100, including external resistor 118.

In FIG. 4, I/O pin 126 of hardware polling peripheral 110 may be electrically coupled via output 126 to an enable pin 402 of external circuitry 400, such as an input to one or more integrated circuits or to one or more discrete electronic components, such as a gate of a MOSFET transistor acting as an enable switch for such front-end circuitry. Depending on implementation, hardware polling peripheral 110 may be used to activate external circuitry 400 by cycling the voltage on output 126. For example, hardware polling peripheral 110 may cause output 126 to a digital one state for 100 us and a digital zero state for 100 ms, thereby creating a duty cycle of 0.1%. After external circuitry 400 is activated, hardware polling peripheral 110 may poll I/O pin 124 to determine a state of an output 404 of external circuitry 400 after a predetermined delay from driving output 126 high, which allows external circuitry 400 to warm up and achieve a fully-operational, active state. Continuing with the above example, hardware polling peripheral 110 may poll I/O pin 124 after 5 us of driving I/O pin 126 high to determine if the comparator of external circuitry 400 has transitioned from a digital zero state to a digital one state, indicating, in this example, that an audio signal greater than a predefined amplitude and within a predefined frequency band was received by the microphone. When a state change is detected on I/O pin 124, hardware polling peripheral 110 may provide an interrupt signal to CPU 102 that causes CPU 102 to exit the low-power state and begin processing the audio signals from external circuitry 400.

Figure 5:
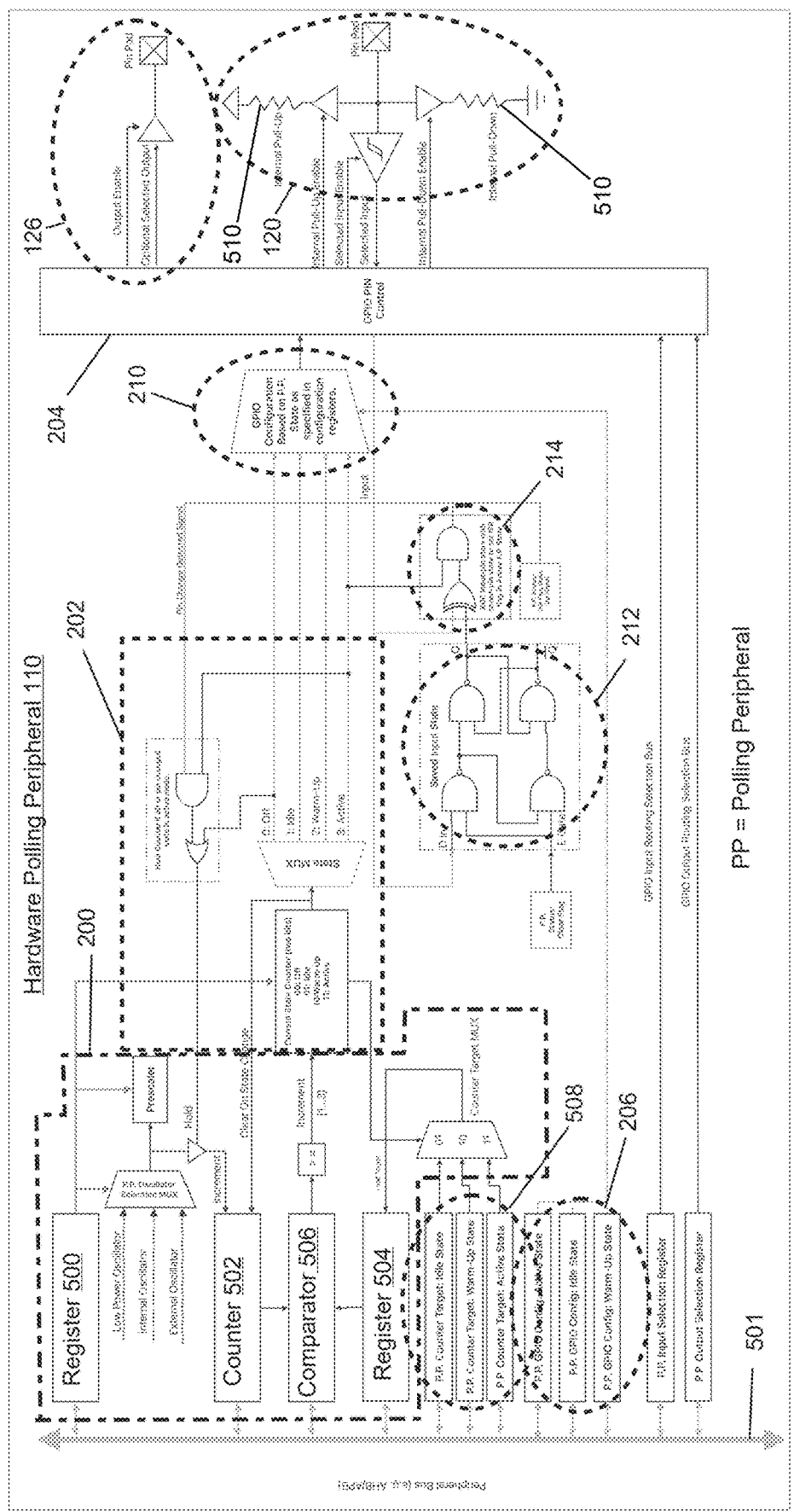
FIG. 5 is a detailed block diagram of one embodiment of the hardware polling peripheral as shown in FIG. 2.

FIG. 5 is a detailed block diagram of one embodiment of hardware polling peripheral 110. While the principal components of polling peripheral 110 are shown and described, certain ancillary circuitry may be shown but not described, as one skilled in the art would understand how to construct polling peripheral 110 given the principal components and description thereof. It should also be understood that the circuitry shown in FIG. 5 is merely exemplary, and that the same principle of operation of polling peripheral 110 may be achieved using different components and/or arrangements.

In FIG. 5, low-power hardware timer 200 comprises a hardware register 500 for storing timing information associated with each of the polling states, i.e., in this embodiment, idle, warm-up and active. The timing information is received from CPU 102 via a data bus 501 while CPU 102 is in an active state. Typically, CPU 102 loads register 500 once upon initial power-on of battery-powered device 100.

Signals from one of a low-power oscillator, internal oscillator, or an external oscillator is chosen to drive counter 502, comprising a standard, digital counter well-known in the art. Register 504 is loaded at the start of each polling state with a time (i.e., clock cycles) associated with each particular polling state and comparator 506 is used to compare the count of counter 502 with the polling state time as stored by register 504. Register 504 is loaded with polling state times as pre-stored by state registers 508, in this example, one state register for each polling state times. When the two are equal, the present polling state is complete and register 504 is loaded with the next polling cycle time (i.e., idle, warm-up or active).

When the polling time period associated with each polling state is complete, the output of comparator 506 is incremented to indicate to state machine 202 that a new polling state has started. In the embodiment shown in FIG. 5, a STATE MUX, i.e., multiplexer, provides indications of the current polling state to polling logic 210.

In one embodiment, upon a change in polling state, polling logic 210 reads I/O configuration register 206, shown in FIG. 5 as three separate registers, one for each polling state. Each register has been pre-loaded with I/O pin configuration information from CPU 102 via bus 501, in some embodiment, for use with GPIO 204. Polling logic 210 may then configure GPIO 204 to configure inputs, outputs, internal pullup/pulldown resistors 510 and/or external pullup/pulldown resistors coupled to I/O pin 126 (not shown) in accordance with the information stored by I/O configuration register 206 associated with each polling state.

When the active polling state begins, polling logic 210 reads the voltage on any I/O pin designated as an input pin by I/O configuration register 206, in some embodiment, via GPIO 204. In one embodiment, the voltage level for each input pin is provided by GPIO 204 to memory 212, where it/they is/are stored for comparison to a future voltage reading(s). The voltage(s) from the current reading are additionally each provided to logic gate 214 where, in this embodiment, an interrupt is generated and sent to CPU 102 when a current voltage reading has changed from a previous voltage reading. In one embodiment, when the voltage state has changed, polling logic 210 may read the voltage on any input pins two or more times to ensure that the voltage has, indeed, changed.

Figure 6A:
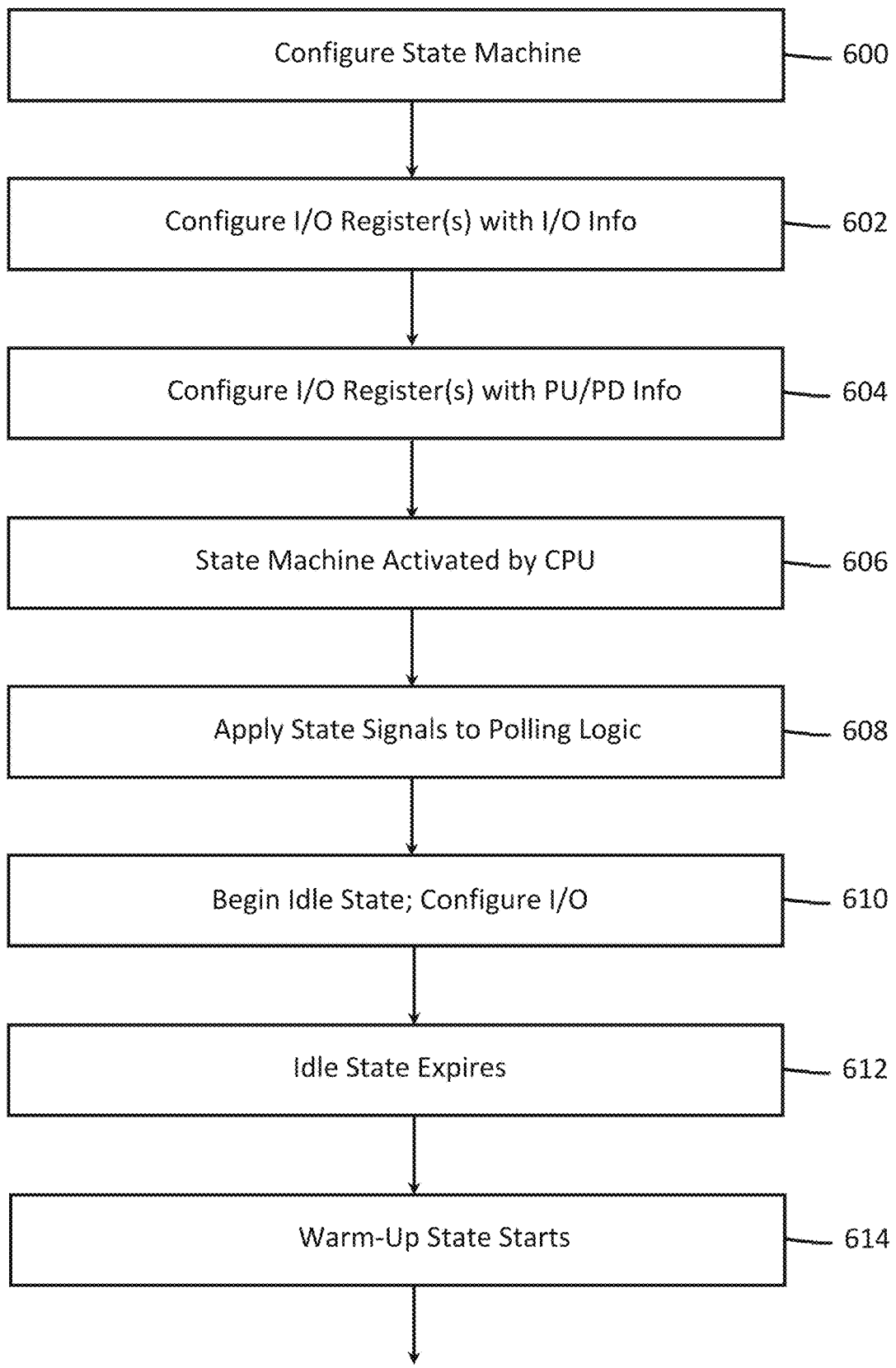
FIGS. 6A-6C represent a flow diagram illustrating one embodiment of a method for reducing power consumption of the battery-powered electronic device as shown in FIG. 1.
Figure 6B:
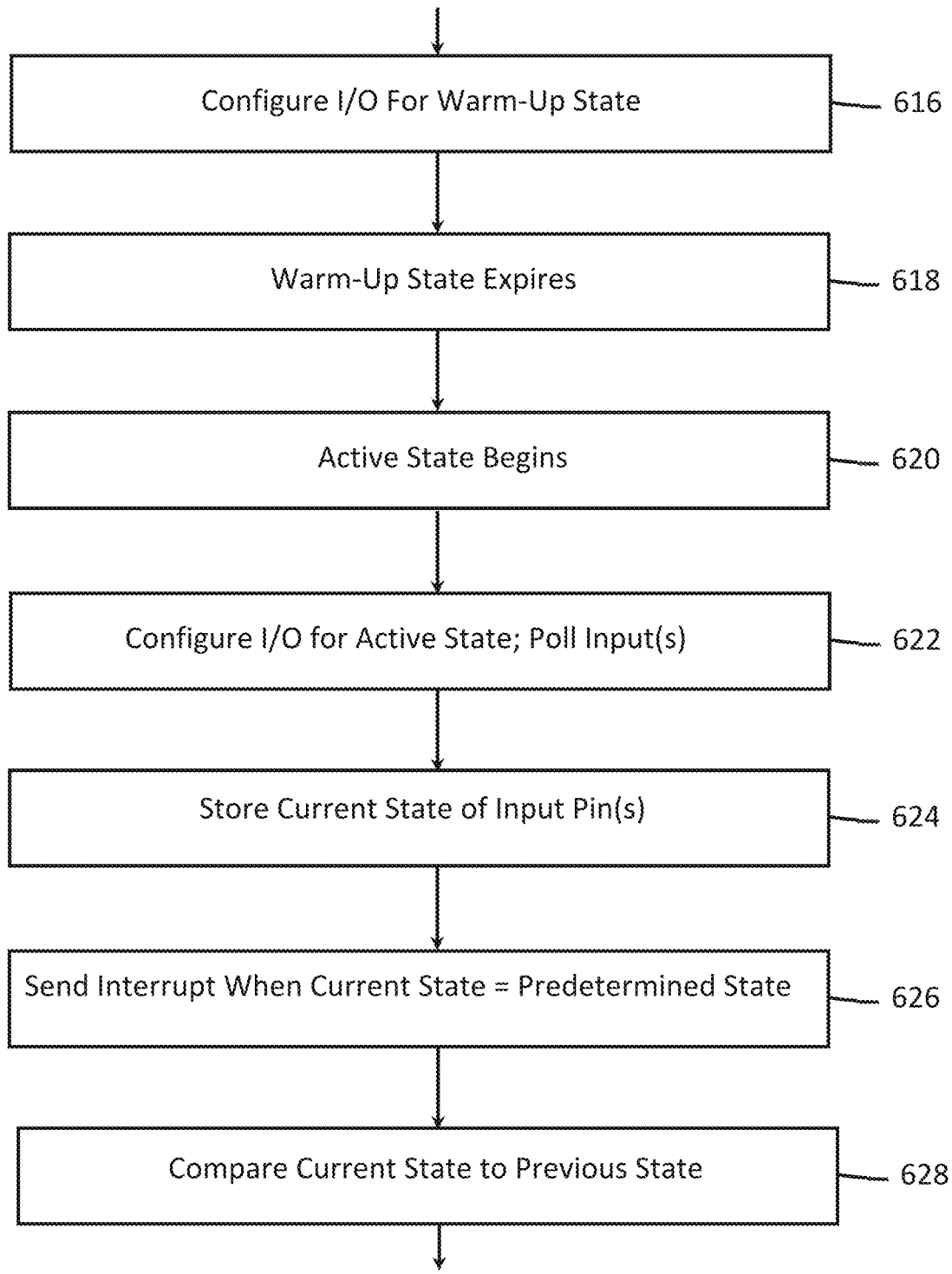
Figure 6C:
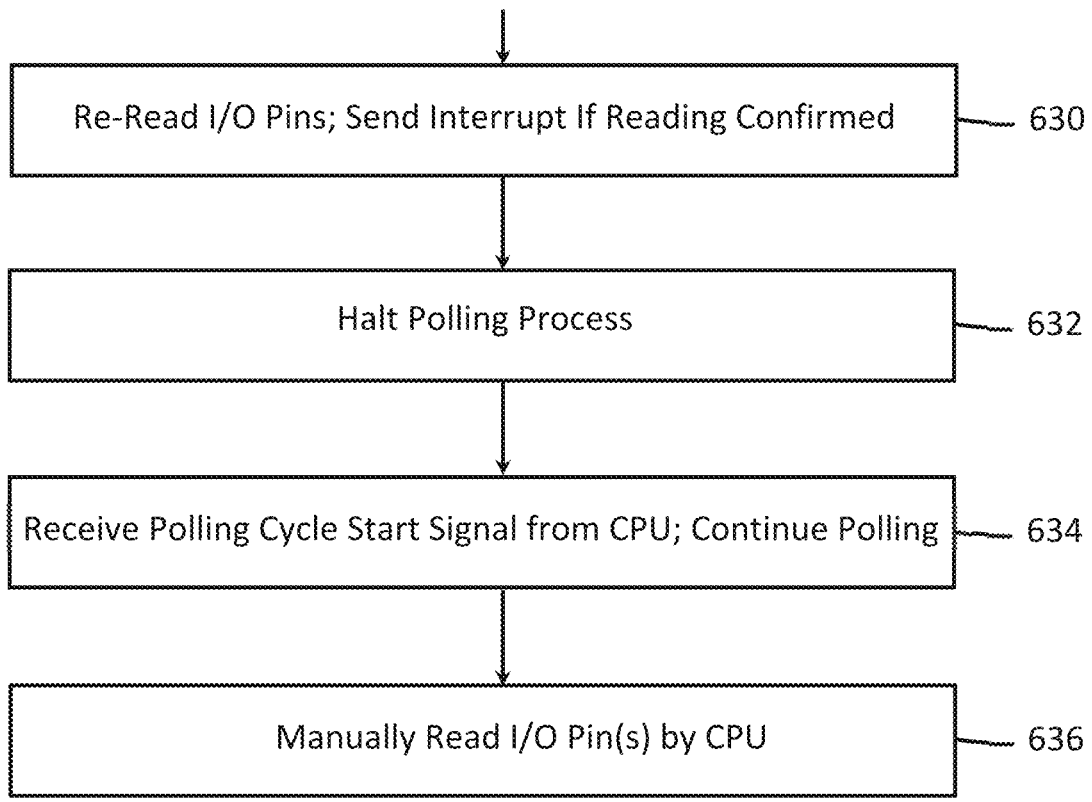

FIGS. 6A-6C represent a flow diagram illustrating one embodiment of a method for reducing power consumption of a battery-powered electronic device. It should be understood that in some embodiments, not all of the method steps shown in FIGS. 6A-6C are performed and that the order in which the steps are performed may be different in other embodiments.

At step 600, CPU 102 may configure state machine 202 to provide one or more state signals to polling logic 210 of polling logic 210. State machine 202 may comprise separate hardware from polling logic 210 or, alternatively, be incorporated into polling logic 210. Therefore, reference to state machine 202 shall also include reference to polling logic 210. CPU 102 may configure state machine 202 to poll I/O pin 124 at a particular duty cycle, defined by one of the following:

1. A relatively long idle time period followed by a warm-up time period, followed by an active time period
2. A relatively long idle time period, followed by a warm-up time period, and a read delay time for reading I/O pin 124 after the warm-up time expires
3. A relatively long idle time period, followed by a warm-up time period. In this embodiment, as soon as the warm-up time expires, polling logic 210 reads I/O pin 124

For purposes of example, it will be assumed that CPU configures state machine 202 to produce an idle time of 100 ms, a warm-up time of 20 us and an active state for 5 µs.

State machine 202 operates based on one or more timing signals provided by hardware timer(s) 200. Such hardware timer(s) 200 are well known in the art, typically comprising a crystal oscillator and a number of flip-flops and related circuitry. It should be understood that hardware timer(s) 200 exclude firmware-dependent logic, i.e., any type of electronic circuit or device that executes firmware.

At step 602, CPU 102, while in an active state, may configure one or more hardware I/O configuration registers 206 of polling logic 210. For example, CPU 102 may load these registers with data values that define which I/O pins of hardware polling peripheral 110 will be used, which pins will be defined as and input, which pins will be defined as an output and may define input and output pins as high or low during at least the active polling state. Again, it should be understood that hardware I/O configuration registers 206 exclude firmware-dependent logic, i.e., any type of electronic circuit or device that executes firmware.

At step 604, CPU 102 may additionally configure I/O configuration register 206 to define which inputs will be pulled up or down internally to hardware polling peripheral 110 during the warm-up state and during a reading of I/O pin 124. Configuration of resistor configuration registers may additionally include identifying outputs that will be pulled high or low in the case of using one or more external pull-up/pull-down resistors, and whether to apply a high or a low to such identified I/O pins during the warm-up state and while reading I/O pin 124. Once again, it should be understood that hardware I/O configuration registers 206 exclude firmware-dependent logic, i.e., any type of electronic circuit or device that executing firmware.

At step 606, state machine 202 may be activated by CPU 102 just before CPU 102 enters into a low-power state of operation. CPU 102 may enter into a low-power state of operation upon one or more predetermined events or periodically based on a timer. While CPU 102 is in the low-power, or quiescent, state, hardware polling peripheral 110 actively polls I/O pin 124 in accordance with the state signals provided by state machine 202. This allows for increased power-savings, as CPU 102 may remain in the quiescent state until activated by an interrupt from hardware polling peripheral 110.

At step 608, state machine 202, in one embodiment, produces three state signals, an idle signal, a warm-up signal, and an active signal each associated with the idle state, the warm-up state, and the active state, respectively. In another embodiment, state machine 202 provides a single signal that indicates the start of a duty cycle and polling logic 210 determines when to transition to the warm-up state and the active state, as preconfigured by CPU 102. In one embodiment, each one of the state signals is used to enable a respective portion of polling logic 210 during each defined state. For example, in one embodiment, a first group of electronic circuits of polling logic 210 may be activated when the idle signal becomes active (either high or low), while a second group of electronic circuits of polling logic 210 is activated when the warm-up signal becomes active (and, in one embodiment, the first group of electronic circuits is deactivated).

At step 610, the idle polling state begins as the idle state signal from state machine 202 is transitioned. Polling logic 210 may retrieve I/O configuration information from I/O configuration register 206 in order to configure certain I/O pins as inputs or outputs during the idle state, in some embodiments via GPIO 204, and/or may cause one or more I/O pins to float, apply voltages and/or grounds to one or more resistors of internal PU/PD circuitry 120 and/or I/O pins 126 designated as outputs by I/O configuration register 206.

At step 612, state machine 202 determines that the idle state has expired, in association with the timing information provided earlier by CPU 102. State machine 202 may determine that the idle state has expired using digital counters to monitor the elapsed time since the idle signal was activated.

At step 614, in response to determining that the idle state has expired, state machine 202 may cause the idle signal to change state, returning to its original state, and may also cause the warm-up state signal to also change state to an active state. In another embodiment, a warm-up state may not be used. In this embodiment, only two outputs are used from state machine 202: an idle state signal and an active state signal. In this case, when the idle state expires, state machine 202 may cause the idle state signal to return to its original state and cause the active state signal to change state, causing polling logic 210 to read I/O pin 124.

Returning to the case where a warm-up state is used, at step 616, in response to receiving the warm-up state signal, polling logic 210 may configure one or more I/O pins as input or output during the warm-up state, such as to configure I/O pin 124 as an input and I/O pin 126 as an output. In one embodiment, configuration of I/O pins as input or output may be performed once, during a first polling cycle, and remain allocated during the active and idle states. Additionally, polling logic 210 may cause one or more voltages or grounds to be applied to one or more internal pull-up/pull-down resistors of internal PU/PD circuitry 120, as defined by I/O configuration register 206, and/or apply one or more voltages or grounds to I/O pin 126 as an output, also in accordance with I/O configuration register 206. In some embodiments, polling logic 210 may additionally actively couple an opposing end of an internal pullup/pulldown resistor to I/O pin 124, in embodiments where the opposing end of the pullup/pulldown resistor is "hard-wired" to I/O pin 124. I/O pin 126 may be used to apply a voltage or ground to external resistor 118 or to external circuitry 400 in order to enable or disable external circuitry 400.

At step 618, state machine 202 may determine that the warm-up state has expired, based on the timing information associated with the warm-up state provided previously by CPU 102. State machine 202 may determine that the warm-up state has expired using digital counters to monitor the elapsed time since the warm-up signal was activated, or from when the idle state was activated.

At step 620, in response to determining that the warm-up state has expired, state machine 202 may cause the warm-up state signal to change state, returning to its original state, and may also cause the active state signal to also change state to an active state, signaling to polling logic 210 that actions associated with the active state should begin.

At step 622, in response to determining that the active state signal has changed state, polling logic 210 may poll I/O pin 124, in some embodiments via GPIO 204, based on the timing and input pin designations stored by I/O configuration register 206, identifying I/O pin 124 as an input pin. During polling, polling logic 210 determines a particular state of I/O pin 124, i.e., a digital high or digital low level.

At step 624, polling logic 210 may store the digital state of I/O pin 124 in memory 212, such as one or more flip-flops or some other memory of battery-powered device 100 that remains active while CPU 102 is in the low-power, quiescent state.

At step 626, in one embodiment, polling logic 210 may provide an interrupt to CPU 102 when the state of I/O pin 124 is in a predetermined state, as specified by I/O configuration register 206. In this embodiment, memory 212 and logic gate circuitry 214 are not used. For example, if I/O pin 124 is polled and a digital high is present, polling logic 210 may provide an interrupt to CPU 102, indicating that CPU 102 should exit the low-power, quiescent state and enter an active state of operation in order to take one or more predetermined actions in response to receiving the interrupt.

At step 628, in another embodiment, prior to sending an interrupt to CPU 102, polling logic 210 may operate on a present reading of I/O pin 124 using a previous reading of I/O pin 124 stored in memory 212. In this embodiment, polling logic 210 sends an interrupt to CPU 102 only when a predetermined result from the operation is determined. For example, in FIG. 2, logic gate circuitry 214 circuitry comprises an exclusive OR logic gate having a first input from memory 212 of a previous reading of I/O pin 124 and another input from polling logic 210 providing a current reading of I/O pin 124. In this embodiment, when the previous reading and the present reading are the same, this means that there has been no change to I/O pin 124 and, therefore, no need to wake CPU 102. In this case, the active state terminates and the idle state begins once more, and steps 608 through 628 are repeated. On the other hand, when the present reading is different than the previous reading, this indicates a change of I/O pin 124 and, in response, in one embodiment, the output of logic gate circuitry 214 is sent as an interrupt to CPU 102.

In some embodiments, where two or more I/O pins are polled during the active polling state, logic gate circuitry 214 may comprise one or more additional logic gates to track the readings of each I/O pin and, based on the logic, cause in interrupt to be sent to CPU 102 when the readings of at least one of the I/O pins has changed since a previous reading, when two or more I/O pins change state, etc.

At step 630, in one embodiment, after polling I/O pin 124 and determining a change of state since a previous reading, polling logic 210 may be configured to re-read the voltage on I/O pin 124 to ensure that the voltage has actually changed state, rather than a false reading due to noise, debounce, etc. In this embodiment, when polling logic 210 determines that two consecutive readings are the same, polling logic 210 sends an interrupt to CPU 102. Polling logic 210 may be configured to repeat the voltage reading of I/O pin 124 any number of times, with a delay between each reading set, for example, in I/O configuration register 206.

At step 632, when an interrupt is generated by polling logic 210 or logic gate circuitry 214, as the case may be, the polling process described by steps 608 through 628 may be halted by either CPU 102 or by polling logic 210. In another embodiment, the polling process may continue and polling logic 210 remains in the active state. In the case of halting the polling process by CPU 102, CPU 102 may provide a signal to hardware timer(s) 200, state machine 202 or polling logic 210, halting the polling process. In the case of polling logic 210, polling logic 210 may generate a signal that disables hardware timer(s) 200, state machine 202 or a portion of polling logic 210, also halting the polling process.

At step 634, at some time after being woken by an interrupt from polling peripheral 110, CPU 102 may provide an output interrupt to polling logic 210, indicating that CPU 102 is, once again, about to enter a low-power or quiescent state, and for state machine 202 to cause the polling process described above to commence once again.

At step 636, in one embodiment, CPU 102 may manually read I/O pin 124 of hardware polling peripheral 110 by sending an output interrupt to hardware timer(s) 200, state machine 202 and/or polling logic 210. In one embodiment, this may cause the polling process to stop and for polling logic 210 to read I/O pin 124 and provide the result to CPU 102 via, for example, a data bus (not shown). In another embodiment, this may cause the polling process to stop and for polling logic 210 to place polling logic 210 into the warm-up state, where one or more I/O pins of hardware polling peripheral 110 are configured as inputs or outputs, voltages or grounds applied to internal/external pull-up/pull-down resistors and/or external circuitry 600. Then, polling logic 210 may read I/O pin 124 and provide the results to CPU 102 via, in one embodiment, the data bus. In one embodiment, after a manual reading I/O pin 124 has occurred, CPU 102 or polling logic 210 may enable the polling process once again, in one embodiment, beginning where the polling process was stopped, and in another embodiment, starting the polling process anew.

Although specific advantages have been enumerated above, various embodiments may include some, none, or all of the enumerated advantages.

Other technical advantages may become readily apparent to one of ordinary skill in the art after review of the foregoing figures and description.

It should be understood at the outset that, although exemplary embodiments are illustrated in the figures and described above, the principles of the present disclosure may be implemented using any number of techniques, whether currently known or not. The present disclosure should in no way be limited to the exemplary implementations and techniques illustrated in the drawings and described above.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. The article "a" means "one or more".

To aid the Patent Office and any readers of any patent issued on this application in interpreting the claims appended hereto, there is no intention that any of the appended claims or claim elements invoke 35 U.S.C. 112(f) unless the words "means for" or "step for" are explicitly used in the particular claim.

What is claimed is:

1. A battery-powered electronic device, comprising:
 a processor; and
 a hardware polling peripheral, configured to periodically poll one or more configurable I/O pins of the hardware polling peripheral for a change in state while the processor is in a low-power state, comprising:
  an I/O configuration register configured to store I/O configuration information associated with the one or more configurable I/O pins;
  polling logic for configuring a first I/O pin of the hardware polling peripheral as an input and a second I/O pin of the hardware polling peripheral as an output in accordance with the I/O configuration register, for periodically polling the first I/O pin while the processor is in the low-power state (a "polling cycle") and sending an interrupt signal to the processor via the second I/O pin when a change of state of the first I/O pin is detected by the polling logic.

2. The battery-powered electronic device of claim 1, wherein the hardware polling peripheral further comprises:
 an internal resistor;
 wherein the polling logic is further configured to apply either a voltage or ground to a first end of the internal resistor in accordance with the configuration information stored by the I/O configuration register during an active state of the polling cycle.

3. The battery-powered electronic device of claim 2, wherein the polling logic is further configured to couple a second end of the internal resistor to the first I/O pin during the active state of the polling cycle.

4. The battery-powered electronic device of claim 2, wherein the polling logic is further configured to apply the power or the ground to the second end of the internal resistor after the hardware polling peripheral exits an idle state and to remove the voltage or the ground from the second end of the internal resistor after polling the first I/O pin.

5. The battery-powered electronic device of claim 2, wherein the polling logic is further configured to apply the power to the first end of the internal resistor if ground was applied during an idle state of the polling cycle and to apply the ground to the first end of the internal resistor if the voltage was applied to the second end of the internal resistor during the idle state.

6. The battery-powered electronic device of claim 1, further comprising:
an external circuit coupled to the hardware polling peripheral, comprising an output coupled to the first I/O pin and an input coupled to a third I/O pin of the hardware polling peripheral;
wherein the polling logic is further configured to configure the third I/O pin as a second output in accordance with the I/O configuration register and apply a voltage, or ground, to the third I/O pin during an active state of the polling cycle.

7. The battery-powered electronic device of claim 1, further comprising:
a state machine configured to provide state signals to the polling logic that causes the hardware polling peripheral to transition from an idle state to an active state and, while in the active state, polling the first I/O pin.

8. The battery-powered electronic device of claim 7, wherein the state machine is further configured to provide a first state signal to the polling logic that causes the hardware polling peripheral to transition from the idle state to a warm-up state, to provide a second state signal to the polling logic that causes the hardware polling peripheral to transition from the warm-up state to the active state and, while in the warm-up state, the polling logic is configured to configure the first I/O pin and the second I/O pin.

9. The battery-powered electronic device of claim 7, wherein the state machine is further configured to provide a first state signal to the polling logic that causes the hardware polling peripheral to transition from an idle state to the active state and, while in the active state, the polling logic configures the first I/O pin and the second I/O pin, and polls the first I/O pin.

10. The battery-powered electronic device of claim 1, further comprising:
one or more logic gates;
wherein sending the interrupt signal to the processor when a change of state of the first I/O pin is detected comprises:
comparing a current state of the first I/O pin to a previous state of the first I/O pin by the one or more logic gates; and
sending the interrupt signal only when the current state is different than the previous state.

11. A method for reducing a power consumption of a battery-powered electronic device, comprising:
configuring a hardware state machine of a hardware polling peripheral to provide state signals to polling logic of the hardware polling peripheral;
configuring a hardware I/O configuration register of the hardware polling peripheral with I/O pin configuration information associated with one or more I/O pins of the hardware polling peripheral, respectively, the I/O pin configuration information indicating that a first I/O pin of the hardware polling peripheral is an input and a second I/O pin of the hardware polling peripheral is an output;
sending a signal to the hardware polling peripheral indicating that a processor coupled to the hardware polling peripheral is or will be in a low-power mode of operation;
entering, by the processor, the low-power state of operation;
in response to receiving the signal, periodically polling the first I/O pin of the hardware polling peripheral (a "polling cycle") by the polling logic in accordance with the hardware state machine for a change in state of the first I/O pin while the processor is in the low-power state of operation; and
sending an interrupt signal to the processor via the second I/O pin when a change in state of the first I/O pin is detected.

12. The method of claim 11, further comprising:
apply either a voltage or ground to a first end of an internal resistor of the hardware polling peripheral in accordance with the configuration information stored by the I/O configuration register during an active state of the polling cycle.

13. The method of claim 12, further comprising:
coupling a second end of the internal resistor to the first I/O pin during the active state of the polling cycle.

14. The method of claim 12, further comprising providing a first state signal to the polling logic that causes the hardware polling peripheral to transition from an idle state to the active state and, while in the active state, configuring the first I/O pin, configuring the second I/O pin, and polling the first I/O pin.

15. The method of claim 12, further comprising applying the power or the ground to the second end of the internal resistor after the hardware polling peripheral exits an idle state and removing the voltage or the ground from the second end of the internal resistor after polling the first I/O pin.

16. The method of claim 12, further comprising applying the power to the first end of the internal resistor if ground was applied during an idle state of the polling cycle and applying the ground to the first end of the internal resistor if the voltage was applied to the second end of the internal resistor during the idle state.

17. The method of claim 11, further comprising:
configuring a third I/O pin of the hardware polling peripheral as a second output in accordance with the information stored by the I/O configuration register; and
upon entering a warm-up state of the polling cycle, applying either a voltage or a ground to the third I/O pin by the polling logic, where the third I/O pin is electrically coupled to an external circuit separate from the hardware polling peripheral.

18. The method of claim 11, further comprising:
providing a first state signal to the polling logic that causes the hardware polling peripheral to transition from an idle state to an active state and, while in the active state, polling the first I/O pin.

19. The method of claim 11, further comprising:
providing a first state signal to the polling logic that causes the hardware polling peripheral to transition from an idle state of the polling cycle of to a warm-up state of the polling cycle, and for providing a second state signal to the polling logic that causes the hardware polling peripheral to transition from the warm-up state to an active state of the polling cycle and, while in the active state, polling the first I/O pin.

20. The method of claim 11, wherein sending the interrupt signal to the processor when a change of state of the first I/O pin is detected comprises:
   comparing a current state of the first I/O pin to a previous state of the first I/O pin; and
   sending the interrupt signal only when the current state is different than the previous state.

* * * * *